United States Patent
Sipperley et al.

(10) Patent No.: US 10,495,028 B1
(45) Date of Patent: Dec. 3, 2019

(54) THERMOELECTRIC ROCKET PROPELLANT TANK PRESSURIZATION SYSTEM

(71) Applicant: Vector Launch Inc., Tucson, AZ (US)

(72) Inventors: Mark Christopher Sipperley, Costa Mesa, CA (US); Colin Healey Smith, Glendale, CA (US)

(73) Assignee: Vector Launch Inc., Tucson, AZ (US)

(*) Notice: Subject to any disclaimer, the term of this patent is extended or adjusted under 35 U.S.C. 154(b) by 0 days.

(21) Appl. No.: 16/209,213

(22) Filed: Dec. 4, 2018

(51) Int. Cl.
| | |
|---|---|
| F02K 9/56 | (2006.01) |
| F02K 9/46 | (2006.01) |
| F02K 9/50 | (2006.01) |
| F02K 9/64 | (2006.01) |
| F02K 9/60 | (2006.01) |
| F02K 9/97 | (2006.01) |

(52) U.S. Cl.
CPC ............ F02K 9/563 (2013.01); F02K 9/46 (2013.01); F02K 9/50 (2013.01); F02K 9/605 (2013.01); F02K 9/64 (2013.01); F02K 9/972 (2013.01); F05D 2270/303 (2013.01)

(58) Field of Classification Search
CPC ..... F02K 9/42; F02K 9/44; F02K 9/46; F02K 9/50; F02K 9/563; F02K 9/64; F02K 9/605; F02K 9/972
See application file for complete search history.

(56) References Cited

U.S. PATENT DOCUMENTS

| | | | | |
|---|---|---|---|---|
| 3,224,189 A * | 12/1965 | Kenny | ........... | B64G 1/402 60/204 |
| 3,229,459 A * | 1/1966 | Cervenka | ........... | B64G 1/401 60/244 |
| 3,597,923 A * | 8/1971 | Simon | ........... | F02K 9/44 60/260 |
| 6,457,306 B1 * | 10/2002 | Abel | ........... | B64G 1/401 417/16 |
| 7,178,339 B2 * | 2/2007 | Goldmeer | ........... | B63G 8/10 60/39.53 |
| 7,762,498 B1 * | 7/2010 | Henderson | ........... | B64G 1/401 244/171.1 |
| 8,313,056 B2 * | 11/2012 | Jarmon | ........... | F01D 15/10 244/58 |
| 9,446,862 B2 * | 9/2016 | Barthoulot | ........... | B64G 1/401 |
| 2014/0260186 A1 * | 9/2014 | Bahn | ........... | F02K 9/42 60/257 |
| 2015/0027102 A1 * | 1/2015 | Bahn | ........... | F02K 9/425 60/258 |

* cited by examiner

*Primary Examiner* — Lorne E Meade (57) ABSTRACT

Various enhanced rocket engine systems are discussed herein. In one implementation, a rocket engine system includes a combustion chamber, and at least one propellant tank that holds propellant in at least a liquid state. The rocket engine system also includes a pump configured to pump liquid propellant from the at least one propellant tank through a thermoelectric generator (TEG) system and a heat exchanger. The TEG system is configured to produce electrical power for the pump based at least on a temperature differential between the liquid propellant from the at least one propellant tank and heat produced in the combustion chamber during an active state of the rocket engine. The heat exchanger is configured to receive heat from the combustion chamber and pressurize the at least one propellant tank by heating at least partially liquid propellant received from the TEG system.

18 Claims, 3 Drawing Sheets

THERMOELECTRIC ROCKET PROPELLANT TANK PRESSURIZATION SYSTEM

BACKGROUND

Rocket and space engine systems can employ different engine configurations and engine types that reflect the particular mission, launch requirements, as well as the types of payloads expected. In liquid-fueled engine configurations, fuel and oxidizer types can be selected according to energy needs, specific impulse characteristics, and other factors. However, the design and components used for rocket engines can vary considerably based upon the fuel and oxidizer selections. These components can include propellant tanks, feed lines, pumps, propellant injection components, and combustion chambers, among other components. Propellant tanks can be employed for both fuel and oxidizer in various implementations.

When propellant tanks are employed, these tanks might employ gas pressurization of head space or ullage space that can remain in the propellant tanks after liquid propellant has been consumed. One example for pressurizing propellant tanks is based on having a large initial amount of ullage. In this example, propellant tanks are initially partially filled with propellant, with a remaining volume comprising a pre-pressurized inert pressurant gas. However, using an inert pressurant gas might require large and heavy propellant tanks since the tanks are designed for a greater initial pressure. Also, this example does not allow for control of the propellant tank pressure profile, and therefore thrust. Another approach for pressurizing propellant tanks in a pressure-fed propulsion system can involve using a separate supply of inert gas, which is pumped or pre-pressurized and fed to the propellant tanks to fill the propellant tanks volume that has been vacated by consumed propellants.

However, these inert gas systems can also be heavy, complex, expensive, and prone to component failures. An amount of required inert pressurant gas might be reduced by heating it, such as via a heat exchanger by the engine, or by employing trace propellant gasses mixed with an inert pressurant gas at levels which do not make the inert pressurant gas flammable. This mixture can be then run over a catalyst bed, triggering the combustion of the trace propellant gasses which heats up the inert pressurant gas. However, as with inert gas systems, these catalyst-based systems can be expensive, heavy, and can add complexity and risks of leakage, particularly over long missions.

Overview

Various enhanced rocket engine systems are discussed herein. In one implementation, a rocket engine system includes a combustion chamber, and at least one propellant tank that holds propellant in at least a liquid state. The rocket engine system also includes a pump configured to pump liquid propellant from the at least one propellant tank through a thermoelectric generator (TEG) system and a heat exchanger. The TEG system is configured to produce electrical power for the pump based at least on a temperature differential between the liquid propellant from the at least one propellant tank and heat produced in the combustion chamber during an active state of the rocket engine. The heat exchanger is configured to receive heat from the combustion chamber and pressurize the at least one propellant tank by heating at least partially liquid propellant received from the TEG system.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Rocket engine systems can be employed in launch vehicles and secondary stages that deploy satellites and space-faring probes. Example launch systems that incorporate rocket engines can include satellite launch vehicles that can provide cost-effective launch services to low Earth orbit (LEO). Although the enhanced implementations herein can be deployed onto smaller launch vehicles in the emerging "cubesat" and "nanosat" arenas, similar techniques can also be applied to larger launch systems and associated rocket engine systems.

Liquid propellants are widely used in rocket engines. These rocket engines can have propellants selected based on various factors, such as payload, mission profiles, or other factors. However, typical rocket engines are designed with specific propellants in mind which drives selection of components, materials, and other elements to support the selected propellants. The examples herein relate generally to rocket engines that employ a propellant combination of a liquid fuel with an oxidizer. However, the various examples herein can include improvements for use in any suitable rocket engine that employs other propellants. Example fuels include bipropellants, such as hydrogen, kerosene, methane, propylene, or other fuels which combust when combined with an oxidizer. One example oxidizer includes oxygen, which might be stored as liquid oxygen (LOX) held in a cryogenic state, gaseous oxygen (GOX), or combinations thereof. Other propellants include monopropellants, such as hydrazine, which do not require an oxidizer.

Propellants are typically contained in associated fuel and oxidizer tanks, referred to herein as propellant tanks. Propellant tanks might store one or more cryogenically cooled propellants. Propellants are pressurized and provided through associated propellant lines to a combustion chamber using valves and propellant pumps or pumping mechanisms. Valves can comprise any valve type and material suitable for use in a rocket engine environment and for handling cryogenic fuels, such as ball valves, butterfly valves, needle valves, or others, including combinations thereof. The propellants then react in the combustion chamber and are directed out of nozzle features to provide thrust to the associated vehicle. Control valves and injection manifolds can be employed to direct the propellants to the combustion chamber in a controlled manner.

Sensors can be included to aid in control and monitoring of any rocket engine, such as pressure sensors, temperature sensors, vibration sensors, acoustic sensors, optical sensors, stress/strain sensors, and various video or audio monitoring systems. These sensors monitor associated characteristics and performance of the elements of a rocket system and can transfer information related to the monitored elements to a control system comprising various electronics, electromechanical elements, hydraulics, or and circuitry. The sensors can comprise transducers, electrical sensors, electromechanical sensors, and other sensor types. Various communication electronics can be included in the sensors to delivery monitored data and information to an associated control system.

The enhanced rocket engine systems discussed herein can be used in launch systems to reduce weight, cost, and increase performance of associated rocket engines. Specifically, the enhanced implementations herein provide for more efficient and lightweight propellant tank ullage pressurization. The use of evaporated propellant to pressurize a propellant tank can be referred to as autogenous pressurization. As used herein, the term "autogenous" refers to a system that can function essentially in a closed loop, which uses a propellant in a combustion chamber and for pressurization of the propellant tank. The autogenous system described herein employs both electrical power to drive a pump mechanism and cryogenic propellant that is gasified and heated.

Instead of using additional inert gasses which require dedicated tanks, equipment, pumps, and complexity, the examples herein employ thermoelectric generators to power pump systems to autogenously pressurize ullage space in propellant tanks. These thermoelectric generators are enabled at least in part using temperature differentials between combustion chamber or associated heat shield components and cryogenically-cooled propellant. The examples herein provide for propellant tank pressurization having lighter weight, less complexity, less cost, and higher reliability than previously known pressurization systems.

Figure 1:
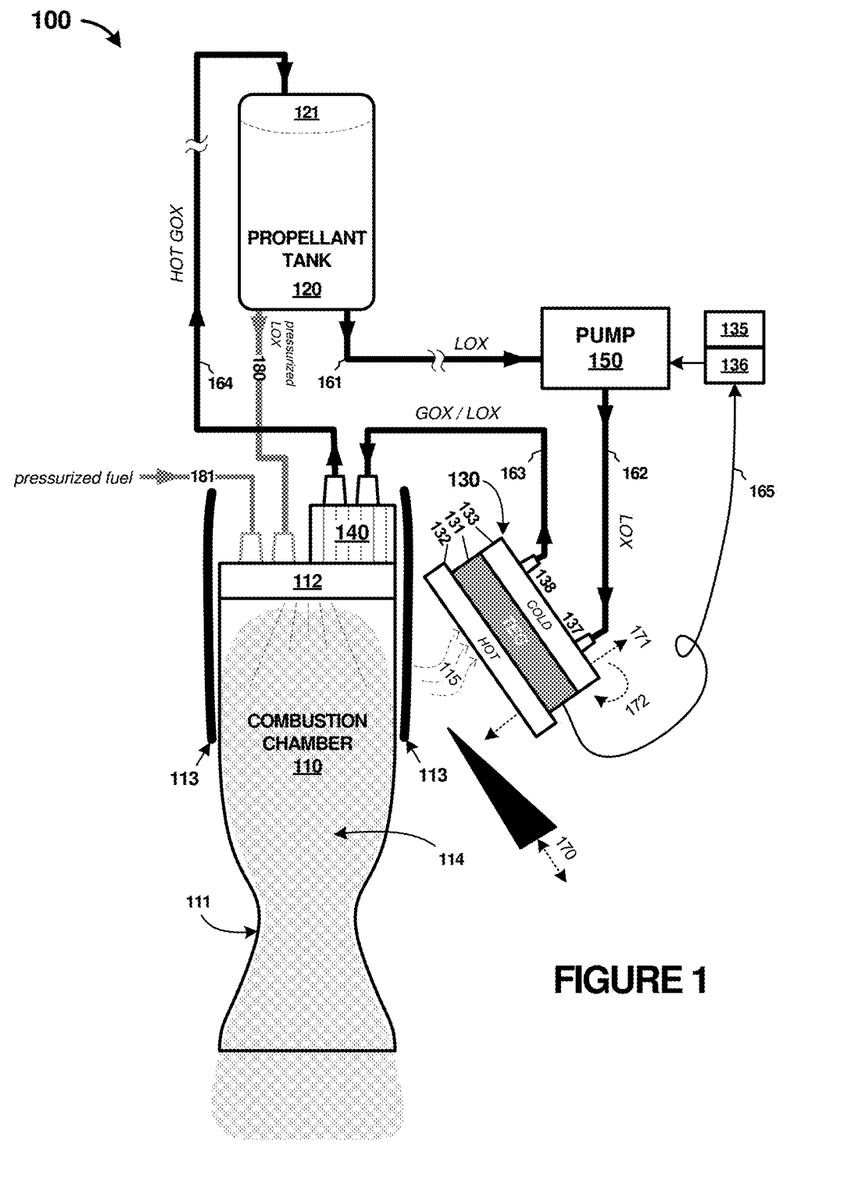
FIG. 1 illustrates a propellant tank pressurization system according to an implementation.

As a first example rocket engine, FIG. 1 is presented. FIG. 1 includes rocket engine system 100. System 100 includes combustion chamber 110, propellant tank 120, thermoelectric generator system (TEG) 130, heat exchanger 140, and pump 150. Combustion chamber 110 is complemented by several peripheral elements, namely injection manifold 112 and thermal barrier 113. Combustion chamber 110 receives pressurized propellant (such as fuel and oxidizer) over feed lines 180-181. Injection manifold 112 receives the pressurized propellant and directs the pressurized propellant into combustion chamber 110 for ignition and combustion. Combustion chamber 110 also comprises nozzle feature 111 which directs combustion products 114 outward to push an associated launch vehicle or secondary rocket stage.

Propellant tank 120 comprises a vessel for containing fuel or oxidizer, such as propylene or oxygen, among other propellants. Propellant tank 120 can comprise various materials, such as aluminum, steel, composite, composite overwrapped pressure vessel (COPV), and other materials. Propellant tank 120 can be rigid or flexible, with optional supportive chassis members or structural elements. Although only one propellant tank is shown in FIG. 1 for clarity, it should be understood that more than one propellant tank might be included. Propellant tank 120 typically contains a densified, cooled, or cryogenic liquid propellant. However, a portion of the volume of propellant tank 120 is no longer in the liquid state, and instead is contained in propellant tank 120 as a gas. This portion of the volume is referred to as ullage, and shown in FIG. 1 as ullage 121. Ullage 121 comprises a gas phase of the propellant in this example, and consumes a variable portion of propellant tank 120. Ullage 121 can also be at different pressures during operation of rocket engine system 100.

TEG system 130 comprises thermoelectric generator (TEG) 131, hot-side element 132, cold manifold 133, control system 136, and auxiliary power system 135. TEG 131 and control system 136 are coupled over link 165. TEG 131 comprises various materials which exhibit a thermoelectric effect, such as the Seebeck effect. These materials can include various types and dopings of semiconductors, silicon-based circuitry, metallic elements, among others. When a temperature differential is introduced between two dissimilar material types, such as semiconductor dopings, an electromotive force can be produced. This electromotive force can comprise a direct current based proportional to the temperature differential. Several discrete elements which exhibit the thermoelectric effect can be placed in parallel or series to achieve desired power, voltage, or current outputs for a given operating temperature differential range.

Hot-side element 132 comprises a metallic or thermally-conductive member which accepts waste heat 115 which is radiated or conducted from combustion chamber 110 or associated thermal barrier 113. Combustion chamber 110 is radiatively cooled in this example, and thus combustion chamber 110 can provide a large amount of easily accessible heat 115. Heat 115 is usually dumped to the environment. However, in the examples herein, hot-side element 132 conducts a portion of this heat to a 'hot side' of TEG 131. Various features can be included with hot-side element 132 to control heat flow from heat 115 to TEG 131, such as adjustable thermal barriers, louvers, or other features. In some examples, motors, servos, tilt elements, among others, might be included to adjust a distance 171, orientation 172, or aspect of hot-side element 132 with regard to the source of heat 115. In yet further examples, various barriers, control rods, or reflectors, or other barriers, such as shown for element 170 in FIG. 1, can be included to shield or otherwise reduce an amount of heat 115 incident onto hot-side element 132. These adjustment features can alter or regulate an amount of heat 115 incident onto hot-side element 132 and control a power output of TEG 131, as well as provide for failsafe features in case heat 115 becomes too high of a magnitude. When movable features are employed, any tubing or wiring that couples to TEG system 130 might include compliant, adjustable, or flexible portions. Moreover, when hot-side element 132 is configured to be moved or rotated, then TEG 131 which is coupled to hot-side element 132 is also correspondingly moved or rotated.

Cold manifold 133 comprises a metallic or thermally-conductive member which conducts heat away from TEG 131 and provides a cooling effect to TEG 131. As seen in FIG. 1, input port 137 and output port 138 are included to transfer cooled propellant through cold manifold 133. Cold manifold 133 can include various fluid channels to allow for passage of cooled propellant through cold manifold 133 and provide for heat exchange among the cooled propellant and cold manifold 133. In one example, a cryogenically cooled liquid is introduced to cold manifold 133 through input port 137, and during passage through cold manifold 133, the cryogenically cooled liquid is at least partially changed in state to gaseous propellant by the time the propellant reaches output port 138. When liquid oxygen (LOX) is employed as the input fluid, then warmer LOX or gaseous oxygen (GOX) can be present at the output of cold manifold 133.

As will be discussed below, the temperature differential between hot-side element 132 and cold manifold 133 drives TEG 131 to produce electrical power due to the thermoelectric effect. TEG 131 can output this electrical power over link 165 to power at least pump 150. Pump 150 comprises an electric displacement pump mechanism which moves propellant from propellant tank 120 through TEG system 130, and into heat exchanger 140. In FIG. 1, pump 150 receives LOX propellant over feed line 161, pressurizes the LOX propellant received from propellant tank 120, and provides this pressurized propellant over feed line 162 for delivery to TEG system 130. After passing through cold manifold 133, the pressurized propellant is further provided to heat exchanger 140.

Pump 150 can comprise any suitable electrically-powered pumping mechanism, such as an electrically driven micropump. Pump 150 can be comprised of materials suitable to handle the selected propellant, whether fuel or oxidizer. In this example, for the sizing of the elements of the rocket engine, pump 150 might require 200 watts (W) of power or less, although other sizing might be employed. As mentioned above, pump 150 can comprise a micropump. The term "micropump" refers to an electrically-driven displacement pump. The term "micro" refers to the fact that a relatively small proportion of the propellant flow for the rocket engine (typically less than 5%) goes through the pump. In contrast, a turbo pump-fed system might route the entire proportion of the propellant flow through the turbo pump. A turbo pump refers to one or more pump sections comprising a turbine directly driven by combustion of fluids, often the propellants themselves. The configuration of system 100 allows pump 150 to be smaller than a turbo pump. For example, a micropump may have a diameter between about 13 and about 100 mm, or between about 20 and about 80 mm, or between about 22 and about 50 mm, and a length between about 5 and about 15 cm, or between about 6 and about 12 cm, or between about 8 and about 10 cm. The capacity or output of a micropump can be between about 200 ml/min and about 100 L/min, or between about 500 ml/min and about 5 L/min, or between about 750 ml/min and about 1.2 L/min, for example. Magnetic drive gear pumps are examples of suitable micropumps for use as pump 150. A predetermined percentage of flow, such as 0.5% to 4% by weight of the primary propellant, for example, can be sufficient to maintain pressure in the autogenous system shown in FIG. 1. Advantageously, the overall size and weight of pump 150 can be drastically reduced compared to known propulsion systems.

Heat exchanger 140 comprises various heat transfer elements which provide for evaporation of any liquid propellant received via feed line 163 and heating of any gaseous propellant which causes the gaseous propellant to expand and further pressurize. Heat exchanger 140 is coupled to combustion chamber 110 or various peripheral components, such as injector manifold 112, to receive heat energy. This heat energy is at least partially transferred into the propellant for phase change and/or gas expansion to pressurize the propellant and distribution over feed line 164. Feed line 164 provides this pressurized propellant, typically in a gaseous phase, to propellant tank 120 for use as ullage 121. The entire outflow from heat exchanger 140 might be used for pressurization of propellant tank 120, as shown in FIG. 1. Alternatively, only part of the outflow from heat exchanger 140 might be used for pressurization, while a remainder is injected into the combustion chamber 110.

Although exact operating temperatures for elements and fluids in FIG. 1 can vary during operation and according to implementation, some examples can be provided. Example approximate temperatures include −173° C. to −140° C. for LOX propellant within feed lines 161-162 and propellant tank 120. Cold manifold 133 might be at temperatures of approximately −150° C. to 0° C. Hot-side element 132 might be at temperatures of approximately 500° C. LOX/GOX propellant within feed line 163 after cold manifold 133 might be at approximately −140° C. to 0° C. GOX propellant within feed line 164 after heat exchanger 140 might be at approximately 400° C. Combustion chamber 110 might be at temperatures of approximately 2200° C.

This autogenous system described herein can control pressurization of propellant tanks in a pressure-fed propulsion system. The examples herein establish controlled pressurization of propellant tanks holding liquid propellants using TEG-based power generation. During rocket engine or spacecraft engine operations, propellant can be drawn from propellant tank 120 by TEG-powered pump 150 through heat exchanger 140 for evaporation to pressurize propellant tank 120. Control system 136 can provide control over the pressurization using variable control of pump 150. Pump 150 can also be used for propellant movement between propellant tanks when multiple propellant tanks are employed. Advantageously, the need for high-pressure inert gas tanks and associated components is eliminated. Furthermore, the TEG-powered pump 150 can be used to indirectly throttle the rocket engine since the pump controls pressurant flow of the propellants. This allows a thrust profile to be tailored in order to optimize the trajectory of a rocket or spacecraft.

As propellant tank 120 is pressurized using the enhanced system described herein, propellant may flow from propellant tank 120 through a conduit or feed line (180, 181) to injection manifold 112, where the propellant in injection manifold 112 is injected into combustion chamber 110 and expands into nozzle 111. Further propellant tanks can be provided that use similar autogenous pressurization systems as described in FIG. 1, such as a fuel tank in addition to an oxidizer tank. Since LOX flows through TEG system 130 in addition to heat exchanger 140, the size and weight of heat exchanger 140 can advantageously be reduced. In FIG. 1, TEG system 130 pre-heats LOX before heat exchanger 140, and thus the performance of heat exchanger 140 is enhanced while extracting energy from temperature differentials between combustion chamber 110 and the LOX to power pump 150. This configuration reduces the need for on-board batteries. When batteries are employed for the full power of pump 150, a large quantity of batteries needed for an entire launch or active timeframe. Thus, when TEG system 130 is employed any battery system would have reduced mass/weight. Advantageously, the use of TEG system 130 can reduce the overall weight of any corresponding rocket system or launch vehicle.

Returning to some additional elements of FIG. 1, control system 136 and auxiliary power system 135 are now discussed. These elements provide power to pump 150 and control operation of pump 150 in conjunction with various sensors which monitor elements of system 100. Control system 136 can comprise pump control circuitry, sensor transceivers and monitor circuitry, power selection circuitry, motor control circuitry, and voltage regulation circuitry, among other elements. Control system 136 receives electrical power produced by TEG system 130 over link 165. Control system 136 provides a regulated version of this power to pump 150. Control system 136 can operate over variable input voltage/currents provided by TEG system 130, and allows for control of speed or flow rate of pump 150. Moreover, control system 136 can selectively receive power from either TEG system 130 or auxiliary power system 135.

Auxiliary power system 135 comprises an auxiliary power source, such as batteries, capacitors, or other electrical power storage systems. Auxiliary power system 135 can provide power to pump 150 for a short time, such as during a start-up period of the rocket engine until TEG system 130 can establish a temperature differential and generate electrical power over link 165. Auxiliary power system 135 can also receive power from TEG system 130 through control system 136 to charge one or more batteries during operation of TEG system 130. In this manner, on-board battery charging can be provided by TEG system 130 in addition to operation of pump 150. This on-board charging can allow for longer mission duration when battery-based startup is employed for the rocket engine until TEG system 130 can begin to produce power from heat differentials.

In addition to providing power to pump 150, TEG system 130 might be employed to provide power to other components of a rocket launch system. For example, elements of control system 136 can be powered by TEG system 130 after TEG system 130 is active. Before TEG system 130 is active, control system 136 can receive power from auxiliary power system 135. Avionics, navigation systems, flight control systems, on-board flight computers, engine control systems, communication systems, sensors, temperature probes and sensing elements, and other components on a launch vehicle or upper stage can receive power from TEG system 130 when active, and from auxiliary power system 135 when TEG system 130 is not active. Switching elements in control system 136 can sense when power is available from TEG system 130 to perform switchover from auxiliary power system 135 to TEG system 130, and vice versa.

When a rocket or other space vehicle is in the vacuum of space, starting an engine can be challenging. For pressure-fed engine systems, an initial pressure is needed to start the engine. Conventional systems often use an inert gas, such as helium or nitrogen, to pre-pressurize a propellant tank prior to turning on an engine, particularly when there is a small volume of liquid propellant at a low temperature and low pressure. Storing high-pressure inert gases, even in composite overwrapped pressure vessels (COPV), presents risks, such as potential stress ruptures. Also, the storage vessels for high-pressure inert gases are typically heavy, adding considerable weight to the overall system. To overcome the challenge of starting an engine without the addition of a pressurized inert gas, auxiliary power system 135 is provided. Once TEG system 130 ramps up, then TEG system 130 can provide power to pump 150 instead of auxiliary power system 135.

Figure 2:
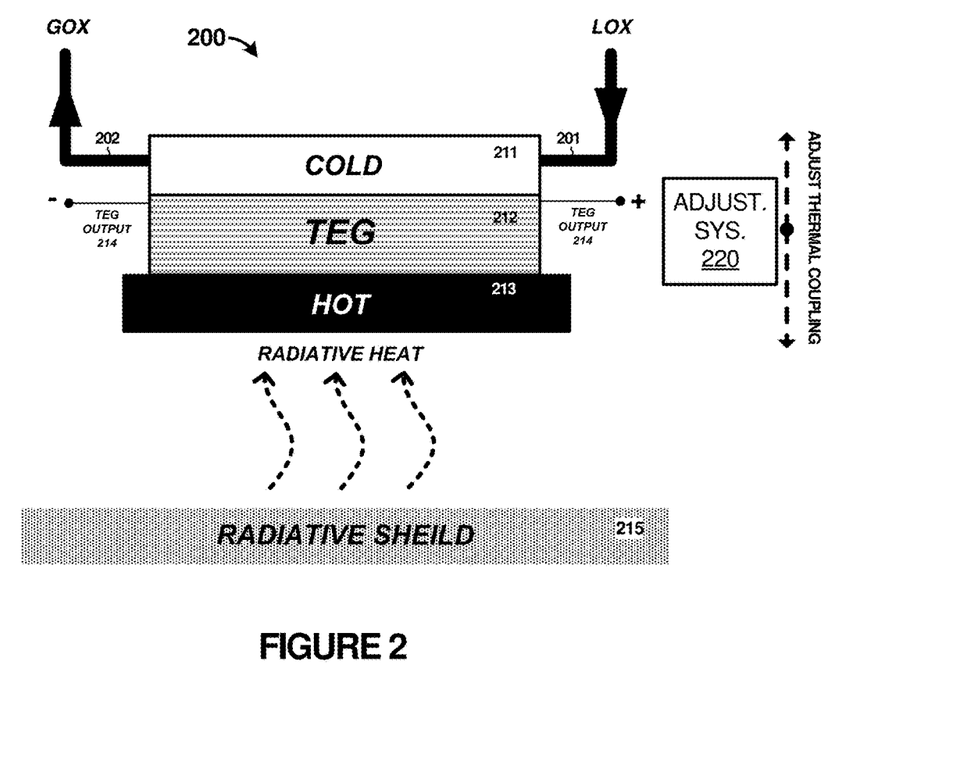
FIG. 2 illustrates a thermoelectric generation system according to an implementation.

To further detail example implementations of TEG system 130, FIG. 2 is presented. FIG. 2 illustrates example TEG system 200, which may be an example implementation of TEG system 130, although variations are possible. TEG system 200 includes input port 201, output port 202, cold-side manifold 211, thermoelectric generator (TEG) element 212, and hot-side member 213.

TEG element 212 produces electrical power responsive to a temperature differential between cold-side manifold 211 and hot-side member 213. TEG element 212 can have one or more electrical outputs, and in FIG. 2 these are represented by TEG output 214, which might have an associated electrical polarity. Example materials that comprise TEG element 212 include doped semiconductor materials, such as silicon germanium (SiGe), bismuth telluride ($Bi_2Te_3$), lead telluride (PbTe), calcium manganese oxide ($Ca_2Mn_3O_8$), as well as material alloys having Bismuth (Bi), Antimony (Sb), Tellurium (Te), Selenium (Se), or Zinc (Zn). Other examples include bimetallic junctions, such as thermopile configurations. TEG element 212 can be layered and include several sub-portions stacked together to form a composite element. TEG element 212 in this example can operate up to or exceeding approximately 800° K or 500° C. on a hot side.

Hot-side member 213 is configured to receive heat energy from a rocket engine combustion chamber or radiative shielding surrounding at least a portion of a rocket engine combustion chamber. Hot-side member 213 comprises a metallic or otherwise thermally conductive plate or member which is thermally bonded to TEG 212. This thermal bonding can be achieved using a thermally conductive epoxy, weld, clamp, or fasteners. Hot-side member 213 conducts at least a portion of the received heat to TEG 212. Hot-side member 213 might include one or more coatings or platings which aid in the conduction of heat. These coatings might be colored, such as black, to further aid in radiative heat absorption.

Cold-side manifold 211 comprises a bulk material with one or more fluid channels or passageways embedded therein. Cold-side manifold 211 typically comprises metallic or composite materials having fluid passageways etched, forged, molded, or otherwise manufactured into a bulk material. In some examples, cold-side manifold 211 is formed by additive manufacturing processes, such as by 3D printing that incorporates the passageways as a part of the additive manufacturing process. Cold-side manifold 211 allows for passage/flow of LOX propellant through the passageways to allow heat to be removed from the bulk material of cold-side manifold 211 and consequently from TEG 212. Cold-side manifold 211 thus provides a cold side to TEG 212 using flowing LOX propellant. LOX propellant is introduced to cold-side manifold 211 through input port 201. As LOX passes through cold-side manifold 211, this LOX can be heated up due to the temperature rise caused by hot-side member 213 and TEG 212. Thus, output port 202 might pass GOX or a LOX/GOX combination, depending upon the temperature rise and pressure changes when the LOX propellant traverses cold-side manifold 211. Cold-side manifold 211 can be considered a heat exchanger in some examples, similar to that of heat exchanger 140 in FIG. 1.

As mentioned above, TEG 212 requires a temperature differential to produce electrical power. Thus, TEG 212 is typically only active when an associated rocket engine is active or running. Radiative shield 215, which may be omitted in some examples, radiates heat which can be received by hot-side member 213. When radiative shield 215 is not employed, then the associated combustion chamber will be the source of heat for TEG 212. Radiative shield 215 or the associated combustion chamber might produce heat after shut-off due to associated thermal mass, but once cooled, TEG 212 is typically not able to produce electrical power.

A void or area proximate to a corresponding rocket engine might have a thermally reflective surface therein to provide thermal protection to portions of the launch vehicle or upper stage from the radiative energy from the rocket engine. This thermally reflective surface comprises a thermal barrier and provides a suitable location to place TEG 212 or a series of TEGs. The cooling required to provide a thermal gradient to TEG 212 can be provided by the cryogenic LOX prior to heading to a heat exchanger. This serves the dual purpose of both reducing the requirements of the heat exchanger by approximately ~20% (by approximately 2 kW or more), as well as generating sufficient electricity to power any electrical pumps needed for an autogenous system (approximately 134 W or more). The pumps can also be the primary design driver for sizing of any on-board battery modules, which might consume over two-thirds of the energy output of the battery modules. While typical TEGs can suffer from low power conversion efficiencies (~6%), this implementation is not hindered by such inefficiencies since unused heat flux in the rocket engine is now being used. When non-TEG systems are employed, such as turbo pumps, these systems might sap energy from propellant combustion, upwards of 10 kW. The TEG examples herein might only employ a hot-side surface area of 288 cm$^2$ (12 cm×24 cm). A TEG of this size along with support hardware should have an approximate mass less than 1 kilogram (kg).

FIG. 2 also includes adjustment system 220. Adjustment system 220 can adjust a thermal coupling or heat transfer intensity experienced by hot-side member 213. Since the amount of radiative heat received by hot-side member 213 might exceed desired levels during operation of the associated rocket engine, adjustment system 220 can be employed to regulate the amount of heat received by hot-side member 213. Various techniques and elements can be employed to perform this heat transfer regulation. In one example, adjustment system 220 comprises a control loop having sensors to detect a temperature of hot-side member 213, and radiative shield 215 or a combustion chamber. Adjustment system 220 can include control circuitry to actively control various adjustment elements to control heat transfer to hot-side member 213 based on the temperature. Adjustment system 220 can comprise motors or servos to alter a positioning, closeness, tilt, or incidence angle of hot-side member 213 with respect to radiative shield 215 or an associated combustion chamber. Adjustment system 220 can comprise slanting mechanisms or gap alteration mechanisms, or other elements. Adjustment system 220 might include adjustable slats or louvers to control an amount of heat that can radiatively reach hot-side member 213. Adjustment system 220 might include thermally insulating or thermally reflective barriers which can be adjusted in a gap between hot-side member 213 and radiative shield 215 to control the intensity of heat transfer to hot-side member 213.

In further examples, hot-side member 213 might include heat pipes or similar features to dump excess heat above a threshold level. This heat dumping might dump heat to external environments, such as the vacuum of space or atmosphere. In yet further examples, hot-side member 213 can include channels or passageways similar to cold-side manifold 211 to allow for flow of LOX or GOX that provides for controllable cooling of hot-side member 213 to below a threshold temperature. Since the operating temperature of hot-side member 213 is far hotter than cold-side manifold 211, a much lower flow rate of LOX/GOX might be required to maintain the temperature. Typically, this threshold temperature will be selected to prevent material degradation or failure of hot-side member 213 as well as TEG 212.

Even further examples might integrate portions of hot-side member 213 and cold-side manifold 211 with an injection manifold or main heat exchanger. For example, in FIG. 1, hot-side element 132 might be at least partially integrated with injection manifold 112, barrier 113, or combustion chamber 110. Cold manifold 133 might be at least partially integrated with heat exchanger 140. TEG system 130 might be placed at least partially between injection manifold 112 and head exchanger 140, or partially combined into the construction of those elements.

Figure 3:
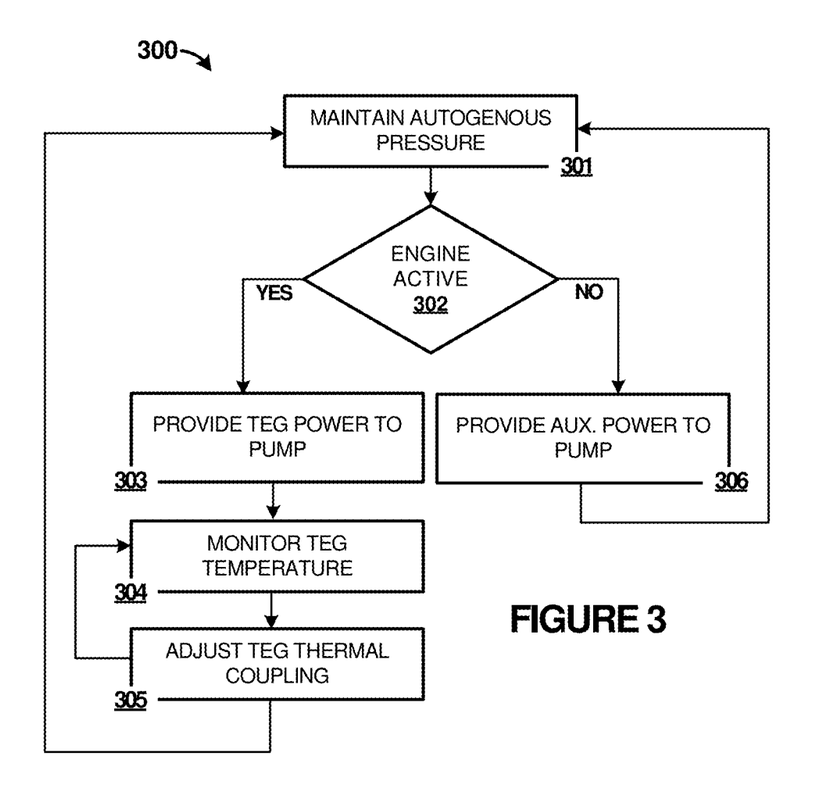
FIG. 3 illustrates propellant tank pressurization system operation according to an implementation.

FIG. 3 is provided to illustrate example operation 300 of the elements of FIG. 1 and FIG. 2. The operations of FIG. 1 will be discussed below in the context of FIG. 1, although it should be understood that elements of FIG. 2 might instead be employed. In FIG. 3, pump 150 maintains (301) autogenous pressure within propellant tank 120. Pump 150 is in-line with feed lines 161-162 and draws LOX through feel lines 161-162 from propellant tank 120. Pump 150 provides for LOX flow into heat exchanger 140 though feed line 163 for evaporation into GOX and transfer to an ullage portion of propellant tank 120 over feed line 164. The pressure in the propellant flow is increased by heat exchanger 140 during engine operation, which provides heat transfer into the propellant. This increase in pressure by expansion from LOX into GOX allows for pressurization of propellant tank 120. Autogenous pressure can be maintained by adjusting a flow rate provided to propellant by pump 150.

However, pump 150 comprises an electrically-driven pump in this example. Pump 150 can receive power from either TEG system 130 or auxiliary power system 135. In operation 302, control system 136 determines if the rocket engine is actively combusting propellants. When the engine not active, then power is not provided by TEG system 130, and instead is provided by auxiliary power system 135 in operation 306. As discussed herein, auxiliary power system 135 might comprise one or more batteries which provided electrical power to pump 150 when the rocket engine is off or inactive.

When the rocket engine is active, such as when actively combusting propellants, then TEG system 130 can be provided with a temperature differential. Control system 136 then provides (303) power to pump 150 which is supplied by TEG system 130. Control system 136 can control a speed or flow rate provided by pump 150 using various circuitry and logic. Moreover, control system 136 can regulate power, voltage, or current received from either TEG system 130 or auxiliary power system 136. Control system 136 might comprise voltage conversion circuitry to adjust a voltage or current provided to pump 150 across varying input voltage/current properties of TEG 130 and auxiliary power system 135.

During operation of TEG 130, control system 136 monitors (304) temperatures associated with TEG 130. These temperatures can include temperatures of combustion chamber 110, propellant temperatures in feed lines that couple to TEG system 130, or temperatures of elements of TEG system 130, such as temperatures of hot-side element 132, cold-side manifold 133, or TEG element 131. Control system 136 adjusts (305) a thermal coupling of at least hot-side element 132 to maintain hot-side element 132 or TEG element 131 below a threshold temperature. This thermal coupling adjustment can occur using any of the techniques or elements described herein, such as positioning, tilt, spacing, barriers, active cooling, or others, including combinations thereof.

Thus, control system 136 regulates thermal transfer of heat from combustion chamber 110 or barrier 113 to hot-side element 132, and consequently regulates power output of TEG 130. Typically, flow of LOX through cold-side manifold 133 will be free-flowing and not regulated other than needed for maintaining autogenous pressure in propellant tank 120. Control system 136 will maintain a temperature of hot elements of TEG system 130 below a failure point as well as to roughly regulate a power output level of TEG elements 131. However, control system 136 can also regulate power outputs of TEG element 131 by selectively enabling/disabling layers or stacks of individual thermoelectric elements of TEG elements 131, dumping excess power into an electrical shunt, or storing energy by charging batteries within auxiliary power system 135, among other operations. Typically, TEG system 130 will be sized to produce roughly the amount of power needed to operate pump 150 and other electrical circuitry on-board the vehicle. However, when TEG system 130 is sized larger than needed this excess power can be handed as described above.

The autogenous pressurization systems described herein can control pressurization of propellant tanks in a pressure-fed propulsion system. The examples herein establish controlled pressurization of propellant tanks holding liquid propellants using TEG-based power generation. During rocket engine or spacecraft engine operations, propellant can be drawn from propellant tanks by TEG-powered pumps and through heat exchangers for heating/evaporation to pressurize the propellant tanks.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A rocket engine system, comprising:
a combustion chamber;
at least one propellant tank that holds propellant in at least a liquid state;
a pump configured to pump liquid propellant from the at least one propellant tank through a thermoelectric generator (TEG) system and a heat exchanger;
the TEG system configured to produce electrical power for the pump based at least on a temperature differential between the liquid propellant from the at least one propellant tank and heat produced in the combustion chamber during an active state of the rocket engine;
the heat exchanger configured to receive heat from the combustion chamber and pressurize the at least one propellant tank by heating at least partially liquid propellant received from the TEG system; and
a control system configured to alter a thermal coupling of the TEG system to the heat produced by the combustion chamber based at least on a temperature monitored for a hot side of the TEG system.

2. The rocket engine system of claim 1, comprising:
the heat exchanger configured to evaporate at least a portion of the propellant received from the TEG system in the liquid state into a gaseous state and pressurize an ullage space in the at least one propellant tank with the propellant in the gaseous state.

3. The rocket engine system of claim 1, wherein the pump alters a pressurization rate of the at least one propellant tank by altering a flow rate of the propellant.

4. The rocket engine system of claim 1, wherein the propellant in at least the liquid state comprises cryogenic liquid oxygen (LOX).

5. The rocket engine system of claim 1, wherein at least a portion of the TEG system is integrated with the heat exchanger.

6. The rocket engine system of claim 1, comprising:
the control system further configured to selectively provide electrical power to the pump from either the TEG system or battery power based at least on the active state of the rocket engine.

7. The rocket engine system of claim 1, comprising:
the control system further configured to provide electrical power to the pump from battery power for startup of the rocket engine, and provide the electrical power to the pump from the TEG system when the rocket engine is in the active state.

8. The rocket engine system of claim 1, comprising:
the control system configured to alter the thermal coupling by at least one of the following: altering a positioning of the TEG system with respect to the combustion chamber, altering a rotation of the TEG system with respect to the combustion chamber, and altering a barrier between the TEG system and the combustion chamber.

9. A method of operating a rocket engine, comprising:
with at least a pump, pumping liquid propellant from at least one propellant tank through a thermoelectric generator (TEG) system and a heat exchanger;
in the TEG system, producing electrical power for the pump based at least on a temperature differential between the liquid propellant from the at least one propellant tank and heat produced in a combustion chamber during an active state of the rocket engine;
in the heat exchanger, pressurizing the at least one propellant tank by heating at least partially liquid propellant received from the TEG system using at least a portion of the heat produced in the combustion chamber; and
altering a thermal coupling of the TEG system to the heat produced by the combustion chamber based at least on a temperature monitored for a hot side of the TEG system.

10. The method of claim 9, further comprising:
in the heat exchanger, evaporating at least a portion of the propellant received from the TEG system in the liquid state into a gaseous state, and pressurizing an ullage space in the at least one propellant tank with the propellant in the gaseous state.

11. The method of claim 9, wherein the pump alters a pressurization rate of the at least one propellant tank by altering a flow rate of the propellant.

12. The method of claim 9, wherein the propellant in at least the liquid state comprises cryogenic liquid oxygen (LOX).

13. The method of claim 9, wherein at least a portion of the TEG system is integrated with the heat exchanger.

14. The method of claim 9, further comprising:
selectively providing electrical power to the pump from either the TEG system or battery power based at least on the active state of the rocket engine.

15. The method of claim 9, further comprising:
providing electrical power to the pump from battery power for startup of the rocket engine, and providing the electrical power to the pump from the TEG system when the rocket engine is in the active state.

16. The method of claim 9, further comprising:
altering the thermal coupling by at least one of the following: altering a positioning of the TEG system with respect to the combustion chamber, altering a rotation of the TEG system with respect to the combustion chamber, and altering a barrier between the TEG system and the combustion chamber.

17. A pressurization system for at least one propellant tank of a rocket engine, comprising:
- a pump configured to pump cryogenic liquid propellant from the at least one propellant tank through a thermoelectric generator (TEG) system and a heat exchanger;
- the TEG system configured to produce electrical power for the pump based at least on a temperature differential between the cryogenic liquid propellant and heat produced in a combustion chamber during an active state of the rocket engine;
- the heat exchanger configured to evaporate at least a portion of the cryogenic liquid propellant received from the TEG system in the cryogenic liquid state into a gaseous state and pressurize an ullage space in the at least one propellant tank with the propellant in the gaseous state; and
- a control system configured to alter a thermal coupling of the TEG system to the heat produced by the combustion chamber based at least on a temperature monitored for a hot side of the TEG system.

18. The pressurization system of claim 17, comprising:
- the control system configured to selectively provide electrical power to the pump from either the TEG system or battery power based at least on the active state of the rocket engine.

* * * * *